United States Patent
Bitto et al.

[11] Patent Number: 6,047,457
[45] Date of Patent: Apr. 11, 2000

[54] METHOD OF FASTENING A METAL BODY TO A MEASURING TUBE OF A CORIOLIS-TYPE MASS FLOW SENSOR

[75] Inventors: Ennio Bitto, Aesch, Switzerland; Rainer Lorenz, Lörrach, Germany

[73] Assignee: Endress + Hauser Flowtec AG, Reinach, Switzerland

[21] Appl. No.: 09/039,788

[22] Filed: Mar. 16, 1998

Related U.S. Application Data

[60] Provisional application No. 60/043,481, Apr. 11, 1997.

[30] Foreign Application Priority Data

Mar. 17, 1997 [EP] European Pat. Off. .............. 97104484

[51] Int. Cl.[7] ..................................................... B21D 39/00
[52] U.S. Cl. ........................................ 29/516; 73/861.355
[58] Field of Search ................ 29/515, 516; 73/861.355, 73/861.356, 861.357

[56] References Cited

U.S. PATENT DOCUMENTS

| | | |
|---|---|---|
| 1,984,115 | 12/1934 | Cooper . |
| 2,710,677 | 6/1955 | Ferris . |
| 3,745,633 | 7/1973 | Langewis . |
| 3,771,343 | 11/1973 | Dawson . |
| 4,524,610 | 6/1985 | Fitzgerald et al. . |
| 4,768,384 | 9/1988 | Flecken et al. . |
| 4,854,031 | 8/1989 | Eisenzimmer . |
| 5,442,846 | 8/1995 | Snaper . |
| 5,602,345 | 2/1997 | Wenger et al. . |
| 5,610,342 | 3/1997 | Wenger et al. . |
| 5,716,342 | 2/1998 | Dumbraveanu et al. . |

FOREIGN PATENT DOCUMENTS

| | | |
|---|---|---|
| 0702213 | 3/1995 | European Pat. Off. . |
| 2 261 837 | 11/1991 | United Kingdom . |

*Primary Examiner*—David P. Bryant
*Attorney, Agent, or Firm*—Bose McKinney & Evans LLP

[57] ABSTRACT

This method of fastening a metal body to a an outer circumference of a single straight measuring tube, consisting of titanium or zirconium, of a Coriolis-type mass flow sensor does not need any heating, for example soldering, welding or brazing, process. The metal body has a circumferential surface and a bore adapted to the outer circumference. The metal body cooperates with an exciter arrangement or with a sensor arrangement or serves as a cantilever mass or as an end piece of the measuring tube. The metal body is pushed on to the measuring tube and is subsequently pressed on to the latter at ambient temperature. A pressure sufficient for fastening but not reducing substantially the lumen of the measuring tube at the fastening position is exerted on at least part of the circumferential surface.

5 Claims, 2 Drawing Sheets

METHOD OF FASTENING A METAL BODY TO A MEASURING TUBE OF A CORIOLIS-TYPE MASS FLOW SENSOR

This application claims benefit of Provisional Application Ser. No. 60/043,481 filed Apr. 11, 1997.

FIELD OF THE INVENTION

The present invention relates to a method of fastening a metal body, having a circumferential surface, to an outer circumference of a straight measuring tube, consisting of titanium or zirconium, of a Coriolis-type mass flow sensor, which metal body has a bore adapted to the outer circumference. Such a metal body cooperates with an exciter arrangement or with a sensor arrangement or serves as a cantilever mass or an end piece of the measuring tube.

BACKGROUND OF THE INVENTION

It is known that Coriolis-type mass flow meters can be used to measure the mass flow and/or the density of a fluid which is flowing in a pipeline into which the Coriolis-type mass flow sensor is inserted.

A special kind of such mass flow sensors wich the invention refers to has a single straight measuring tube. For reaching a sufficient operating temperature range of the mass flow sensor, the measuring tube consists of titanium or zirconium but not of stainless steel.

The measuring tube is set vibrating by the abovementioned exciter arrangement. When the Coriolis-type mass flow sensor is flowed through by a fluid, Coriolis forces act on the measuring tube. As a result, the part of the measuring tube on the fluid inlet side vibrates wich a phase shift with respect to its part on the fluid outlet side. This phase shift is a measure of the instantaneous mass flow rate. As it is known, the instantaneous density of the fluid is proportional to the instantaneous vibration frequency of the measuring tube and, therefore, can be measured, too.

The phase shift is tapped by means of, for example, two sensor arrangements, of which one is arranged on the side of the part of the measuring tube on the fluid inlet side and one is arranged on the side of the part of the measuring tube on the fluid outlet side.

SUMMARY OF THE INVENTION

In the case of commercially available Coriolis-type mass flow sensors having said single measuring tube, the metal bodies mentioned have so far been soldered or welded to the measuring tube. This is a process step to be undertaken at a high temperature leading to a, in particular local, heating of the measuring tube.

The heating causes a significant lowering of the elastic limit of the measuring tube consisting of titanium or zirconium, in case of titanium, for example, from 800 N/mm$^2$ to 500 N/mm$^2$ (N/mm$^2$=Newtons per square millimeters). From this results a lowering of the admissible axial stress and, therefore, a lowering of the operating temperature range of the Coriolis-type mass flow sensor.

One object of the invention therefore consists in specifying a method of fastening a metal body to a measuring tube of a Coriolis-type mass flow sensor which method does not need any heating, for example soldering, welding or brazing, process.

In order to achieve the object, the invention consists in a method of fastening a metal body, having a circumferential surface, to an outer circumference of a single straight measuring tube, consisting of titanium or zirconium, of a Coriolis-type mass flow sensor, which metal body has a bore adapted to the outer circumference and cooperates with an exciter arrangement or with a sensor arrangement or serves as a cantilever mass or as an end piece of the measuring tube, in which method the metal body is pushed on to the measuring tube and is subsequently pressed on to the latter at ambient temperature in such a way that a pressure sufficient for fastening but not reducing substantially the lumen of the measuring tube at the fastening position is exerted on at least part of the circumferential surface.

The GB-A 2,261,837 describes a method of fastening a metal body, having a conical or cylindrical circumferential surface, to an outer circumference of an end of a metal tube, which metal body has a bore adapted to the outer circumference, in which method the metal body is pushed on to the metal tube and is, in a swage, subsequently pressed on to the metal tube until, in the case of the conical circumference, the latter becomes cylindrical and the end of the metal tube becomes conical or, in the case of the cylindrical circumference, the diameter of the end of the metal tube becomes lower than the original diameter.

U.S. Pat. No. 3,745,633 describes a metal press for fastening a magnesium anode having hexagonal circumference to an outer circumference of an end of a metal tube, which which magnesium anode has a bore adapted to the outer circumference, is pushed on to the metal tube and is, in a swage at 175° C. to 260° C. (°C.=Celcius degrees), subsequently pressed on to the metal tube.

According to a first preferred embodiment of the invention, the measuring tube is circularly cylindrical.

According to a second preferred embodiment of the invention the metal body is a metal plate.

According to a third preferred embodiment of the invention, which can also be applied in the case of the first or second embodiment, the metal body is an annular metal plate on whose entire circumferential surface the pressure is exerted.

According to a fourth preferred embodiment of the invention, the metal body has a prescribed thickness in the region of the bore and an extension which is thinner than that, and the pressure is exerted on parts of the metal body which project over the thinner extension.

An essential advantage of the invention consists, inter alia, in that it is possible to dispense wich a soldering, brazing or welding process for fastening the metal body to the measuring tube, since owing to the effect of the pressure a very stable mechanical joint is produced between the measuring tube and the metal body. Said joint is so firm that it cannot be loosened even by long-lasting torsional vibrations of the measuring tube.

Since according to the invention it is paid obtention to the fact that the lumen of the measuring tube is not reduced substantially at the point where the metal body was fastened, it is guaranteed that in the measuring tube no precipitations or sedimentations can occur which would generate a pressure loss.

BRIEF DESCRIPTION OF THE DRAWINGS

The invention is now explained in more detail with the aid of the figures of the drawing, in which—partly in perspective—different exemplary embodiments are represented, and in which identical parts are designated by the same reference numerals.

DETAILED DESCRIPTION OF THE DRAWINGS

Figure 1:
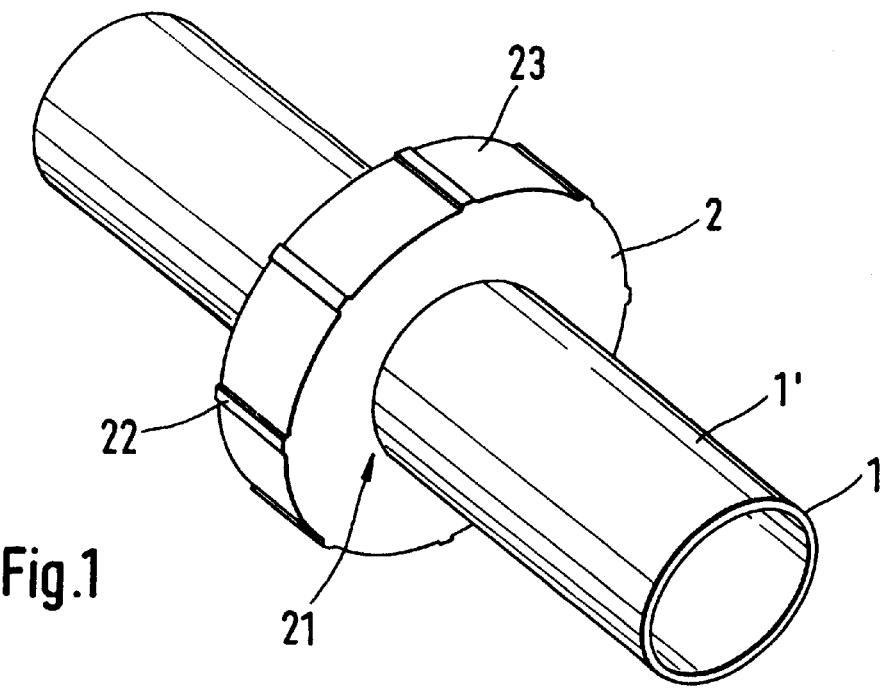
FIG. 1 shows perspectively a metal body, in the form of a circular plate, fastened to a single circularly cylindrical Coriolis-type mass flow sensor measuring tube represented only partly.

FIG. 1 shows perspectively and partly a circularly cylindrical measuring tube 1 which forms part of a Coriolis-type mass flow sensor and in the course of which a metal body 2 in the form of a circular plate has been fastened to an outer circumference 1' of the measuring tube 1.

For this purpose, according to the method of the invention the metal body 2, which has a bore 21, adapted to the outer circumference of the measuring tube 1, and a circumferential surface 22, is firstly pushed on to the measuring tube 1 as far as the fastening site envisaged; in FIG. 1 this is the centre of the measuring tube 1.

Subsequently, the metal body 2 is pressed on to the measuring tube 1 by means of a machine (not shown) by virtue of the fact that a pressure adequate for fastening is exerted on at least part of the circumferential surface 22. This pressure acts radially inward and is exerted by a plurality of jaws of the machine which bear in a planar fashion against the circumferential surface 22. It is exerted only such a pressure that the lumen of the measuring tube at the fastening position is not reduced substantially.

In the fastened state, as represented in FIG. 1, the circumferential surface 22 bearing against the bearing surfaces of the jaws exhibits depression surfaces 23 which are situated slightly deeper than those parts of the circumferential surface 22 which have not been ached upon by the pressure. This is a sign that plastic deformations have occurred on the circumferential surface 22.

Figure 2:
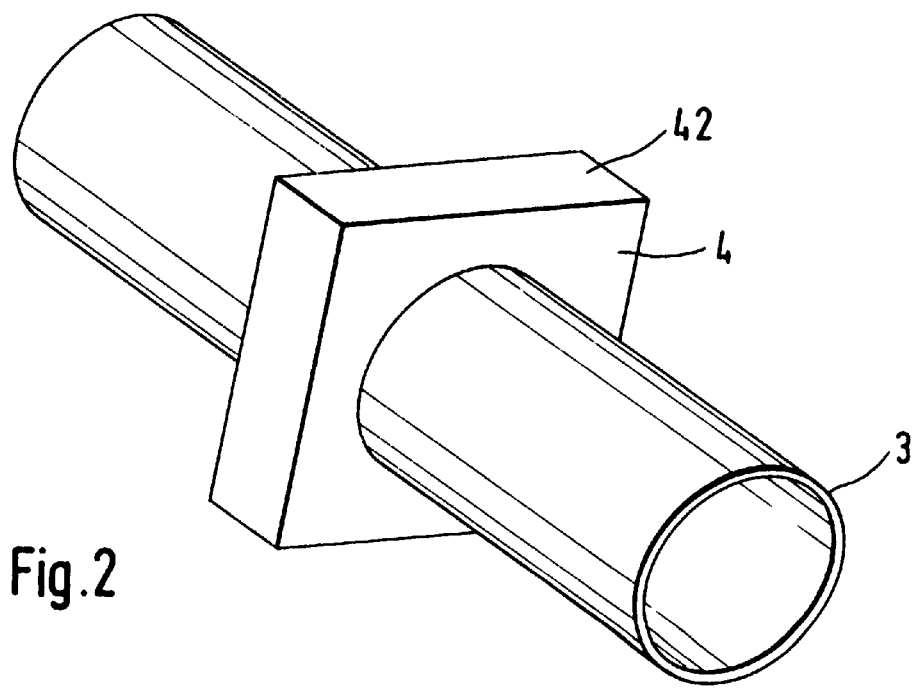
FIG. 2 shows perspectively a metal body, in the form of a square plate, fastened to a single circularly cylindrical Coriolis-type mass flow sensor measuring tube represented only partly.

FIG. 2 shows the state after a metal body 4, in the form of a square plate, has been fastened to a circularly cylindrical measuring tube 3. This was undertaken essentially as follows from the explanation of FIG. 1.

The jaws of the machine which exert the pressure on the circumferential surfaces 42 of the metal body 4 are now preferably applied over all their surfaces, with the result that no depression surfaces are visible. Again, it is exerted only such a pressure that the lumen of the measuring tube at the fastening position is not reduced substantially.

Figure 3:
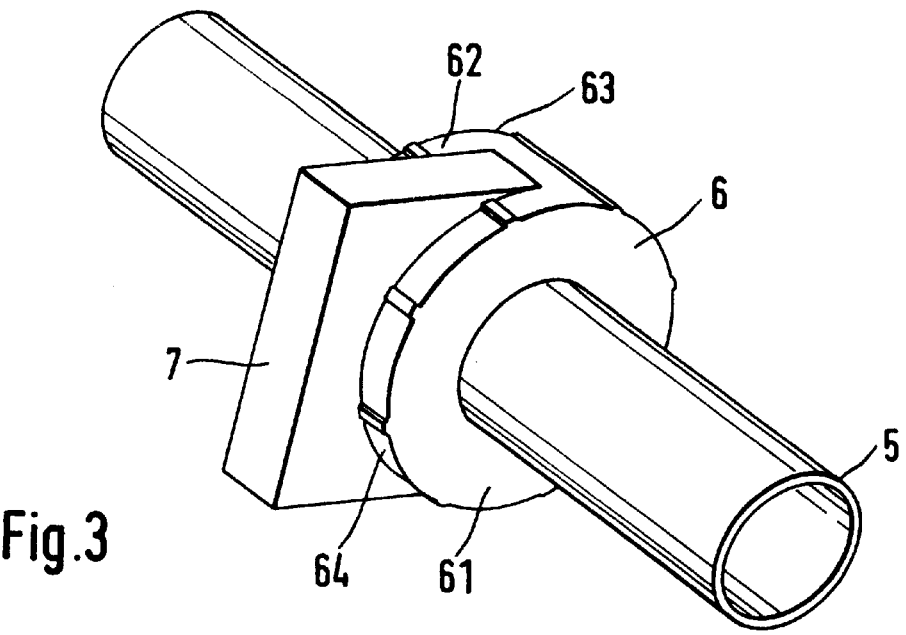
FIG. 3 shows perspectively a metal body, in the form of a circular disc and having an extension, fastened to a single circularly cylindrical Coriolis-type mass flow sensor measuring tube represented only partly.

FIG. 3 shows an example that, instead of a metal body being in the form of a circular or square plate, it can also have any other suitable geometrical form. According to FIG. 3, a metal body 6, in the form of a circular plate and having an extension 7, has been fastened to a circularly cylindrical measuring tube 5.

This was undertaken essentially as follows from the explanation for FIG. 1. The jaws of the machine which exert the necessary pressure on the circumferential surfaces 62 of the metal body 6 bear against the front part 61, in the form of a circular plate, and the rear part 63, in the form of a circular plate, of the metal body 6, with the result that depression surfaces 62, 64 have again now been produced.

Figure 4:
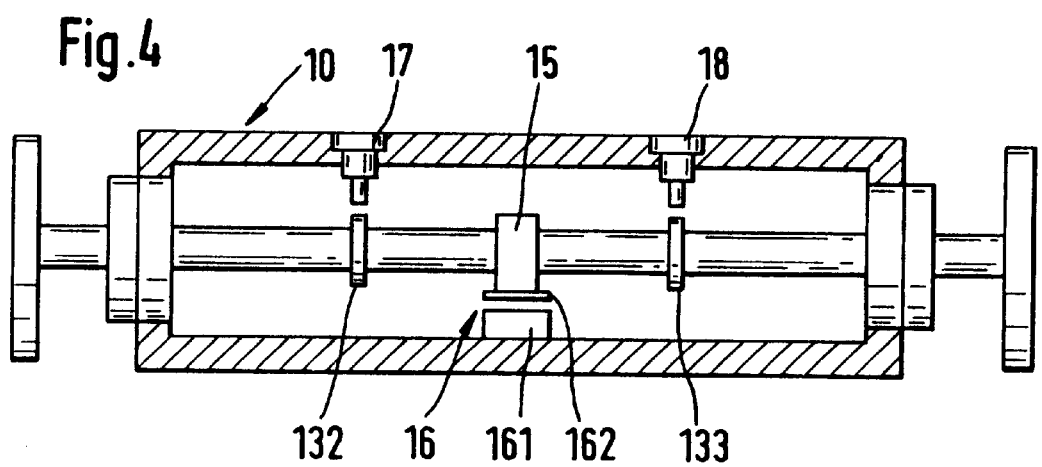
FIG. 4 shows, partly in section, a longitudinal view of a first Coriolis-type mass flow sensor with fastened metal bodies.
Figure 5:
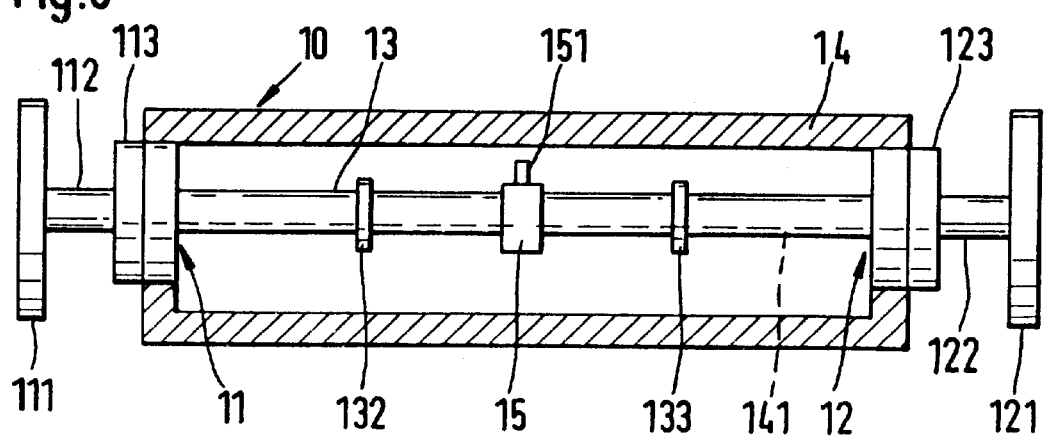
FIG. 5 shows, partly in section, a longitudinal view of a second Coriolis-type mass flow sensor with fastened metal bodies.

The partly sectioned longitudinal views of FIGS. 4 and 5 show a Coriolis-type mass flow sensor 10 which in the case of use is to be inserted into the course of a pipeline, through which a fluid to be measured flows but which, for the sake of clarity, is not represented, of a given diameter and is to be joined in a fluidtight fashion to said pipeline before operation.

Represented in FIGS. 4 and 5 are flanges 111, 121 which correspond to this purpose and are joined via a respective short pipe length 112, 122 to a respective end piece 113, 123 in which an inlet end 11 and an outlet end 12 of a single straight measuring tube 13 respectively open or are fixed therein. The mass flow sensor 10 can also be inserted into the pipeline via other customary fastening means instead of via the flanges 111, 121.

The inlet end 11 and the outlet end 12 of the measuring tube 13 are fastened to a carrier which can be designed, for example, in the form of an open or closed frame or of a cylindrical tube 14. The closed frame or the cylindrical tube 14 surround the measuring tube 13 completely in the fashion of an envelope or casing. The measuring tube 13 and the end pieces 113, 123 has been fastened according to the method of the invention.

Fastened according to the method of the invention to the measuring tube 13, in the middle between the end pieces 113, 123, is a metal body 15, in the form of a circular plate, which cooperates with an exciter arrangement 16 which is arranged approximately in the middle between the end pieces 113, 123. It is, for example, an electromagnetic exciter which, for example, comprises a coil arrangement 161, mounted on the carrier or on the tube 14, and a permanent magnet 162 mounted on the metal body 15.

The exciter arrangement can be provided by various types of exciter arrangements described for this purpose in the prior art of Coriolis-type mass flow sensors and Coriolis-type mass flow meters. The exciter arrangement 16 is used to excite the measuring tube 13 to flexural vibrations during operation whose frequency is equal to the momentary mechanical resonant frequency of the measuring tube.

In FIG. 5, the metal body 15 has an extension 151, as was also represented already in FIG. 3. The extension serves as a cantilever mass such as was described in detail in the earlier U.S. application Ser. No. 08/940,644 filed on Sep. 30, 1997.

Also represented diagrammatically in FIGS. 4 and 5 are a first and a second sensor 17, 18 for the movements on the inlet and outlet sides, respectively, of the measuring tube 13, which are arranged at the same distance between the middle thereof and the inlet and outlet end pieces 113 and 123, respectively. Located at the site of the respective sensor on the measuring tube 13 is a further annular metal body 132, 133, which cooperates with the sensor 17, 18.

The sensors 17, 18 can be various types of sensors such as, for example, displacement, speed or acceleration sensors which operate, for example, elechrodynamically or optically, described for this purpose in the prior art of Coriolis-type mass flow sensors and Coriolis-type mass flow meters.

The metal of the metal body can differ from that of the single measuring tube cosisting of titanium or zirconium, in particular, the metal body can be made from stainless steel.

What is claimed is:

1. A method of fastening a metal body to a single straight measuring tube of a Coriolis-type mass flow sensor, the method comprising the steps of:

selecting a measuring tube for a Coriolis-type mass flow sensor, the measuring tube having an outer circumference, a lumen and a predetermined wall thickness;

selecting a substantially planar metal body having an outer surface and a single bore defining an inner surface, the bore being adapted for interiorly receiving the measuring tube, the separation between the outer surface and the inner surface of the metal body being at least twice the wall thickness of the measuring tube;

placing the metal body at a fastening position on the measuring tube of the Coriolis-type mass flow sensor so that the inner surface of the metal body surrounds the outer circumference of the measuring tube at the fastening position; and exerting a pressure at ambient temperature on at least part of the outer surface of the metal body thereby fastening the metal body to the outer circumference of the measuring tube at the fastening position without substantially reducing the lumen of the measuring tube at the fastening position.

2. The method according to claim 1, wherein the measuring tube is circularly cylindrical.

3. The method according to claim 2, wherein the metal body is an annular metal plate and, in the exerting step, the pressure is exerted on the entire outer surface of the metal body.

4. The method according to claim 1, wherein the metal body is an annular metal plate and, in the exerting step, the pressure is exerted on the entire outer surface of the metal body.

5. The method according to claim 1, wherein the metal body has a prescribed thickness in the region of the bore and an extension extending from a first portion of the outer surface of the metal body, the thickness of the extension being less than the prescribed thickness, and, in the exerting step, the pressure not being exerted on the first portion of the outer surface of the metal body.

* * * * *